United States Patent
Hasti et al.

(10) Patent No.: US 8,180,823 B2
(45) Date of Patent: May 15, 2012

(54) METHOD OF ROUTING MESSAGES TO MULTIPLE CONSUMERS

(75) Inventors: Srinivas Hasti, Stamford, CT (US); Brian Keith Martin, Cary, NC (US); Michael Joseph Spreitzer, Croton-on-Hudson, NY (US); Graham Derek Wallis, Hampshire (GB); David Ware, Wiltshire (GB); Neil George Stanley Young, Hampshire (GB)

(73) Assignee: International Business Machines Corporation, Armonk, NY (US)

( * ) Notice: Subject to any disclaimer, the term of this patent is extended or adjusted under 35 U.S.C. 154(b) by 242 days.

(21) Appl. No.: 12/198,939

(22) Filed: Aug. 27, 2008

(65) Prior Publication Data
US 2010/0057880 A1  Mar. 4, 2010

(51) Int. Cl.
*G06F 15/16* (2006.01)
(52) U.S. Cl. .................. 709/201; 709/233; 709/206
(58) Field of Classification Search .............. 709/201
See application file for complete search history.

(56) References Cited

U.S. PATENT DOCUMENTS

| | | | |
|---|---|---|---|
| 6,788,697 B1 * | 9/2004 | Aweya et al. | 370/412 |
| 6,820,128 B1 * | 11/2004 | Firoiu et al. | 709/233 |
| 7,062,556 B1 * | 6/2006 | Chen et al. | 709/226 |
| 7,243,351 B2 * | 7/2007 | Kundu | 718/102 |
| 7,596,627 B2 * | 9/2009 | Cometto et al. | 709/235 |
| 7,827,227 B2 * | 11/2010 | Iijima et al. | 709/201 |
| 2004/0117794 A1 * | 6/2004 | Kundu | 718/102 |
| 2005/0144246 A1 * | 6/2005 | Malik | 709/206 |
| 2006/0109857 A1 * | 5/2006 | Herrmann | 370/412 |

* cited by examiner

*Primary Examiner* — Djenane Bayard
*Assistant Examiner* — Joiya Cloud
(74) *Attorney, Agent, or Firm* — Patents on Demand, P.A.; Brian K. Buchheit; Scott M. Garrett

(57) ABSTRACT

A method of routing messages to multiple consumers comprises determining a probability function defining message classification probabilities for each of a plurality of consumer sets, receiving a plurality of messages, classifying each message, storing each message in a queue, receiving notification of a consumer available to process a message, ascertaining the consumer set to which the available consumer belongs, accessing the probabilities for the ascertained consumer set, selecting a message classification according to the accessed probabilities, and transmitting a message, of the selected classification, to the available consumer.

19 Claims, 6 Drawing Sheets

26

|        | CS1 | CS2 |
|--------|-----|-----|
| GOLD   | 80% | 50% |
| SILVER | 15% | 30% |
| BRONZE | 5%  | 20% |

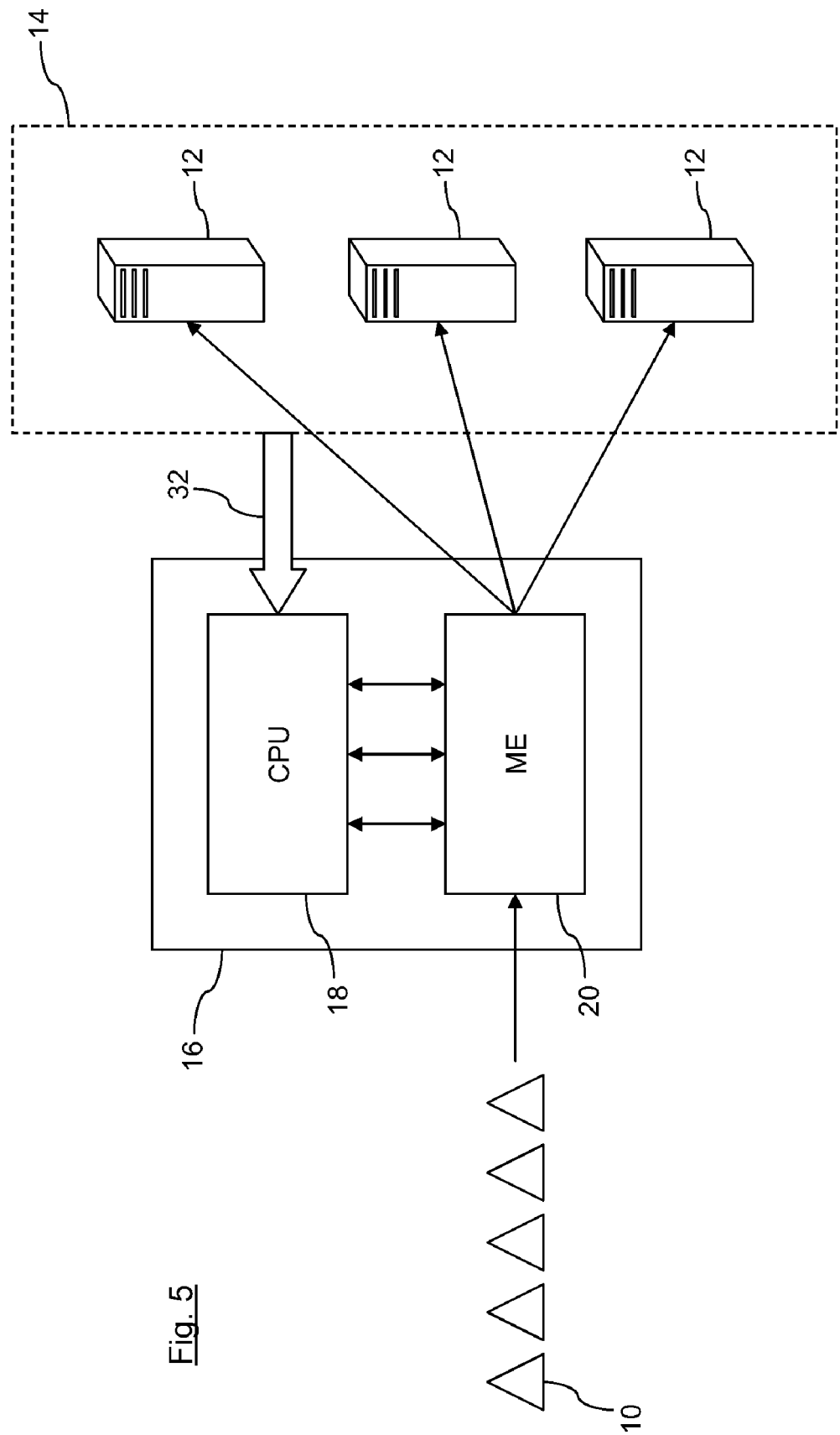

METHOD OF ROUTING MESSAGES TO MULTIPLE CONSUMERS

BACKGROUND

This invention relates to a method of, and a system for, routing messages to multiple consumers. The invention provides a system for message dispatch in a managed environment.

An asynchronous messaging system handles requests, which represent inbound work, for a server complex running service instances. Requests are received by the central processor which can examine them and dispatch them to service instances (consumers). The central processor analyses each incoming request and assigns it a classification that specifies the service level with which it should be processed. The service level has a goal, such as maximum response time, and the central processor attempts to ensure that the request is processed in accordance with the goal. The central processor also monitors the loads (for example, processor load, memory consumption and response times) on the backend servers and dispatches requests to backend servers in an attempt to ensure that no backend server is over or under burdened with work. The central processor is attempting to satisfy both these goals.

If the protocol used to convey the requests is synchronous, the implementation of the above system is relatively straightforward. When classifying a request message, the central processor can decide to which consumer (service) the message should be directed, and dispatch/invoke that consumer (service). Examples of synchronous protocols include RPC, HTTP and IIOP.

However, when applied to an asynchronous protocol, a straightforward implementation will run into problems in attempting to satisfy the dual goals of message service level and server workload profile. A straightforward implementation based on the above only has loose coupling between the classification logic and the dispatch logic. There are two known loosely coupled implementations, each of which has drawbacks. One implementation performs eager assignment of a consumer instance; the other implementation performs lazy assignment. In the eager assignment implementation, the received message is examined on arrival, the message handler decides which classification fits the message and identifies a consumer instance that should process the message. The consumer may be running in a cluster, and therefore have multiple instances; the eager assignment scheme identifies the instance of the consumer that should process the message. The natural implementation is then to queue the message onto the request queue, until the chosen consumer instance is available to do the work. When the consumer is available, the consumer requests a message from the queue and the message is dispatched. The eager assignment implementation can result in double-queuing, which occurs when a message is classified, a consumer instance is selected and the message is en-queued. The selection of consumer was made without consideration for the time at which that consumer will become ready to process another message, the consumer is likely to be processing its previously assigned message and the central processor cannot know for sure how long that will take. At best, the central processor has statistical knowledge of how long a message of the particular classification typically takes, on average. The disadvantage of such eager assignment of the consumer is that such a system prevents another instance of the consumer from processing the message, even if the other instance completes its previous work and becomes eligible to consume the message. The message is forced to wait for the assigned consumer instance to become eligible. The message is effectively double queued, once on the request queue and once again waiting for the assigned consumer instance. This is inefficient, because the eager assignment does not react to changes in background server load, availability or readiness, and prevents the message from being processed by an alternative consumer instance. To overcome this, the processor needs to be given greater discretion.

The lazy assignment implementation analyses each message on arrival and decides which classification fits the message. However, this assignment implementation does not identify the consumer instance. The message is en-queued, and awaits a consumer. The central processor monitors the loads on the backend servers and decides that a particular backend server is ready to accept work. The central processor dispatches that server, and that consumer instance requests a message. The problem that this can run into is that there are multiple consumer instances and they are competing for the messages. So when a consumer is dispatched, there is no guarantee that the message will still be available, as the message could have been consumed by another instance. This leads to poor utilisation of the backend servers, without tighter coupling between the classification and dispatch mechanisms the central processor cannot exercise sufficiently fine-grained and timely control of the workload dispatched to the backend servers.

SUMMARY

It is therefore an object of the invention to improve upon the known art.

According to a first aspect of the present invention, there is provided a method of routing messages to multiple consumers comprising determining a probability function defining message classification probabilities for each of a plurality of consumer sets, receiving a plurality of messages, classifying each message, storing each message in a queue, receiving notification of a consumer available to process a message, ascertaining the consumer set to which the available consumer belongs, accessing the probabilities for the ascertained consumer set, selecting a message classification according to the accessed probabilities, and transmitting a message, of the selected classification, to the available consumer.

According to a second aspect of the present invention, there is provided a system for routing messages to multiple consumers comprising a work management unit comprised of a processor and messaging engine arranged to determine a probability function defining message classification probabilities for each of a plurality of consumer sets, receive a plurality of messages, classify each message, store each message in a queue, receive notification of a consumer available to process a message, ascertain the consumer set to which the available consumer belongs, access the probabilities for the ascertained consumer set, select a message classification according to the accessed probabilities, and to transmit a message, of the selected classification, to the available consumer.

According to a third aspect of the present invention, there is provided a computer program product on a computer readable medium for routing messages to multiple consumers, the product comprising instructions for determining a probability function defining message classification probabilities for each of a plurality of consumer sets, receiving a plurality of messages, classifying each message, storing each message in a queue, receiving notification of a consumer available to process a message, ascertaining the consumer set to which the available consumer belongs, accessing the probabilities for the ascertained consumer set, selecting a message classification according to the accessed probabilities, and transmitting a message, of the selected classification, to the available consumer.

The invention can be implemented in computer software.

In accordance with a preferred embodiment, a solution is provided which increases the degree of coupling between the classification and asynchronous dispatch mechanisms. This results in a system that can be referred to as a tightly-coupled architecture. One of the key concepts in the solution is that of a consumer set. This is an aggregation of all equivalent consumer sessions. Another key concept is that of dispatch weightings, these are a probability density function used to guide the dispatch of messages, within the intersection of a service level and consumer set.

BRIEF DESCRIPTION OF THE SEVERAL VIEWS OF THE DRAWINGS

Embodiments of the present invention will now be described, by way of example only, with reference to the accompanying drawings, in which:—

FIG. 3 is a schematic diagram of a probability function, FIG. 5 is a further schematic diagram of the system.

DETAILED DESCRIPTION

Figure 1:
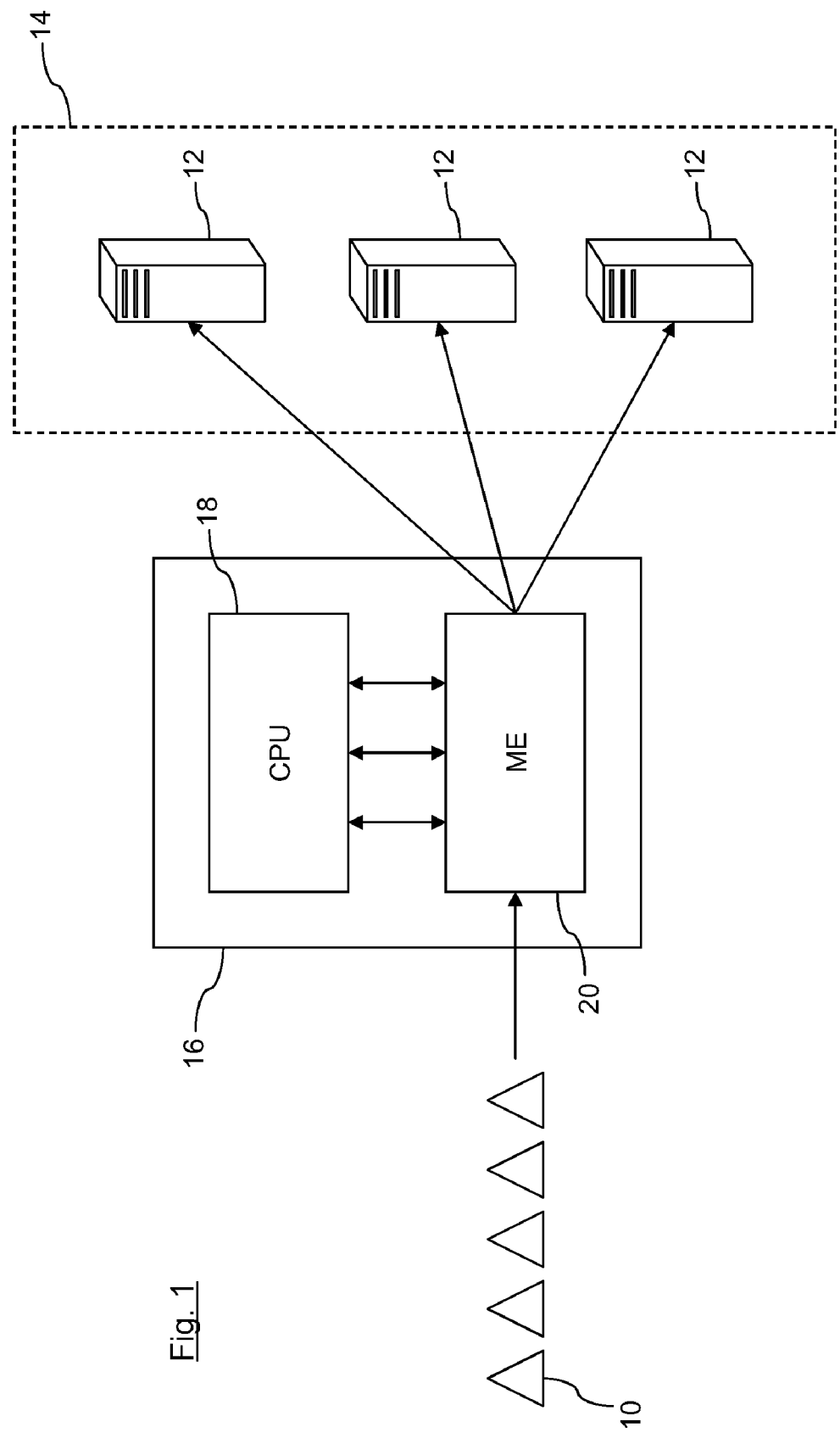
FIG. 1 is a schematic diagram of a system for routing messages to multiple consumers.

The fundamental characteristics of the tightly-coupled approach are that the central processor classifies the message, assigning the message a service level and then eagerly assigning the message to a set of consumer instances, but unlike the loosely-coupled eager assignment scheme, the processor does not identify a specific consumer instance. The central processor also can measure the loads on the backend servers and assign dispatch weightings to the various service levels of messages that could be dispatched to those servers. The central processor sends both these pieces of information to the message processor and can then delegate the dispatch decision to the message processor.

The message processor is preferably armed with two pieces of information (on the one hand, the set of consumers that may receive each message and, on the other, the dispatch weights for the types of message that a set of consumers can receive). The message processor preferably en-queues the request message and waits for a consumer instance to request a message. The scheduling of consumers does not need to be guided by the central processor, they can run freely. When a consumer requests a message, the message processor preferably examines the dispatch weights for the consumer set that the consumer belongs to, and uses the weights as the probability density function to drive the selection of a suitable classification of message from the queue. The message is then preferably dispatched to the consumer. The weightings are preferably used to drive dispatch probability of each classification.

The result, in accordance with a preferred embodiment, is that the message processor is able to dynamically select the message to dispatch to each consumer instance at the time that the consumer instance becomes ready. No message is double queued, every message is preferably processed as soon as any suitable consumer instance becomes available and, provided there are messages to be processed, each consumer instance is preferably supplied with a message as soon as the consumer instance is ready. The service levels of the messages and the loadings on the backend servers are preferably maintained by monitoring the actual processing times of messages of various classifications, and adjusting the dispatch weights accordingly.

Because the system is asynchronous there is no guarantee that the consumers will be started when messages are received by the central processor. Therefore the consumer sets are preferably pre-registered when the servers start, so that messages can be assigned to consumer sets in which instances are later started. This capability is important as it enables the system to operate correctly even when there are consuming applications accessing the same destination with disjoint selectors. On arrival, a message can therefore preferably be classified and assigned to a (not yet active) consumer set.

Preferably, the probability function comprises a table of percentages or ratios, with a first axis representing message classification and a second axis representing consumer set. The probability function, which in a preferable embodiment is a matrix of percentages (or ratios) per message classification, per consumer set, can be simply recalled from storage, defines the percentage chance that a particular classification will be used to select a message, when a consumer indicates that it is ready to receive a message. The probability function can be as simple or as complex as the implementation requires. It delivers the improvement that messages are only transmitted to consumers when they are ready, but includes flexibility about which message is actually transmitted to the available consumer. This is delivered by the probability function, which supports dynamic message selection. Which message is dispatched is determined by the probability function.

Advantageously, the process further comprises monitoring the workload of one or more of the consumers, and/or accessing one or more business rules, and adjusting the probability function accordingly. The probability function does not have to be a static function, but can be adapted as the processing and forwarding of the messages is taking place. For example, if it is detected that consumers of a particular consumer set are processing a particular message classification in a faster than expected time, then the weighting assigned to that per classification, per consumer set in the probability function can be increased, thereby increasing the likelihood that messages of that classification are delivered to the consumers of that specific consumer set. This is essentially a feedback loop, which in real-time will improve the overall efficiency and performance of the processing of the received messages. Ideally, the step of transmitting a message, of the selected classification, to the available consumer, comprises transmitting the oldest message, of the selected classification, to the available consumer. This logical feature of the decision making process ensures that no message remains in the queue waiting to be processed any longer than is strictly necessary. Each consumer will take the oldest message in the specific classification for processing.

A system for routing messages 10 to multiple consumers 12 is shown in FIG. 1. Each message 10 represents a piece of work that is to be carried out by the system. An example of the type of structure that could be embodied by the system of FIG. 1 would be the back-end system of a commercial website. When an end user (a member of the public) makes a purchase on the website, then various messages 10 are generated. These messages 10 might represent such things as a first message 10 to update the user's account, a second message 10 to update a stock list, a third message 10 to acquire money from the user's bank account, and so on.

The consumers 12 are formed in a cluster 14. The consumers 12 are shown as individual servers 12, but the expression "consumer" does not specifically refer to a piece of hardware. A consumer 12 could simply be an application running on a machine, and as such multiple consumers 12 could be running on the same machine, either all carrying out the same process function, or actually carrying out different functions. Continuing the example above, a single machine could be maintaining both user accounts and stock lists. A consumer 12 is a consumer 12 of the messages 10, as distinct from a producer of the messages 10.

The routing of the messages within the system is carried out by the application server process 16, which can be considered as a workload management unit 16. This unit 16 comprises a processor 18 and a messaging engine 20, which are connected together in two-way communication. The messaging engine 20 receives the incoming messages 10, and transmits them to the consumers 12. The processor 18 carries out certain tasks in relation to the overall system, such as classifying messages 10 and receiving feedback data from the consumers 12, for the purpose of maintaining workload balance. In general, consumers 12 are in two-way communication with the messaging engine 20, and can request messages 10 for processing.

Figure 2:
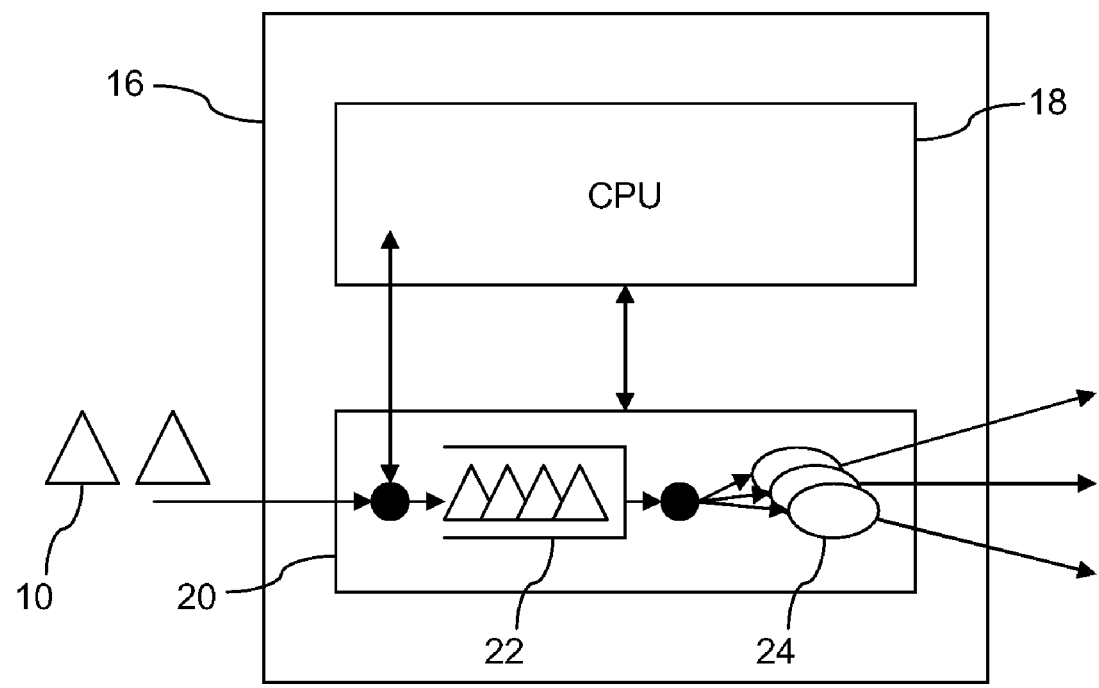
FIG. 2 is a schematic diagram of a workload management unit of the system of FIG. 1.

The workload management unit 16 is performing flow management in relation to the messages 10 and the consumers 12. FIG. 2 shows the unit 16 in more detail. The plurality of messages 10 are received at the messaging engine 20, where classification is determined. Information about the message 10 is passed to the processor 18 at this point, and a classification of the specific message 10 is returned to the messaging engine 20, from the processor 18. The messaging engine 20 then stores the new message 10 in a queue 22. The messages 10 are held in this queue 22 until they are transmitted for processing by a respective consumer 12. The messaging engine also maintains consumer sessions 24 corresponding to the consumers 12. Each consumer session 12 within the messaging engine 20 is a runtime object that represents a conversation between the messaging engine 20 and a consumer instance 12.

The workload management unit 16 can be accessed by an administrator. The administrator has the ability to define performance goals and bind them to specific subsets of the incoming message traffic. In this way, incoming messages 10 can be afforded different levels of service, for example, faster average response time for specific messages 10, which results in certain messages 10 being dispatched more eagerly than other messages 10, while other messages 10 may have to wait for capacity to become available. The classification, performed by the processor 18, is used to implement these different levels of service. The classification may be based on the content of the specific message 10, or may be based upon the originating producer of the message 10, or some other factor or combination of factors.

In addition to using message classification in the routing of the messages 10 by the messaging engine 20, an additional concept of a "consumer set" is also used in the routing of the messages 10. Each consumer 12 is assigned to a consumer set. A consumer set is not necessarily a group of consumers 12 that have the same function, indeed all of the consumers 12 in a specific set could have a different function. The assignment of the consumers 12 into individual consumer sets is a method of allocating the resources required by the consumers 12 into distinct groups.

The method of routing based on message classification and consumer sets, is illustrated by the probability function 26 of FIG. 3. The probability function 26 comprises a table of percentages (but could be ratios), with a first axis representing message classification 28 and a second axis representing consumer sets 30. The probability function 26 defines message classification probabilities for each of a plurality of consumer sets 30. It should be noted that the columns add up to the 100%, not the rows. This is preferable for illustration but is not actually a requirement of a functioning embodiment. The numbers can add up to anything, it is the ratio of the numbers that is important and can be used to calculate a percentage or to populate the probability function 26 directly.

The message classification 28 is split into three classifications, gold, silver and bronze, and the consumers 12 are divided into two individual consumer sets 30, labelled CS1 and CS2. The table 26 of FIG. 3 is deliberately kept simple for ease of explanation, in a practical implementation there is no limitation on the number of different message classifications 28 or consumer sets 30.

The effect of the probability function 26, defined by the table of FIG. 3, is that when a consumer 12 transmits a notification to the messaging engine 20, indicating that the respective consumer 12 is available to process a message, then it is first necessary to ascertaining the consumer set 30 to which the available consumer 12 belongs. Once this has been done, then the probabilities, defined by the function 26, are accessed for the ascertained consumer set 30 and there is selected a message classification 28 according to the accessed probabilities. Once this has been done, then there is transmitted a message 10, of the selected classification 28, to the available consumer 12.

To illustrate the working of the probability function 26, embodied in the table 26, consider the case of a consumer 12 belonging to consumer set CS1, indicating to the message engine 20 that it can receive a message 10 for processing. The consumer's set 30 is determined (CS1) and the relevant probabilities are accessed. For this consumer set 30, the probabilities are gold 80%, silver 15% and bronze 5%. This means that for a consumer 12 of this set 30, 8 out 10 times it will be assigned a "gold" message 10, and so on. A random number is generated, which selects a message classification 28 according to the probabilities, and then a message 10 of that classification 28 is transmitted to the available consumer 12. In general this will be the oldest message 10 stored on the queue 22 that is of the selected classification 28.

The generalised method of operating the system to route the messages 10 is shown in FIG. 4. The first step is the step S1 of determining the probability function 26, which defines the message classification probabilities for each of the plurality of consumer sets 30. The determination of the function 26 may simply be a recall of a stored function 26, or may be the execution of a sub-process which determines the function 26 at that point in time, or may include administrator input via a suitable user interface, or a combination of any of these methods. The probability function 26 can be expressed in any suitable fashion, for example as percentages or ratios, or target message rates per unit of time etc.

Figure 4A:
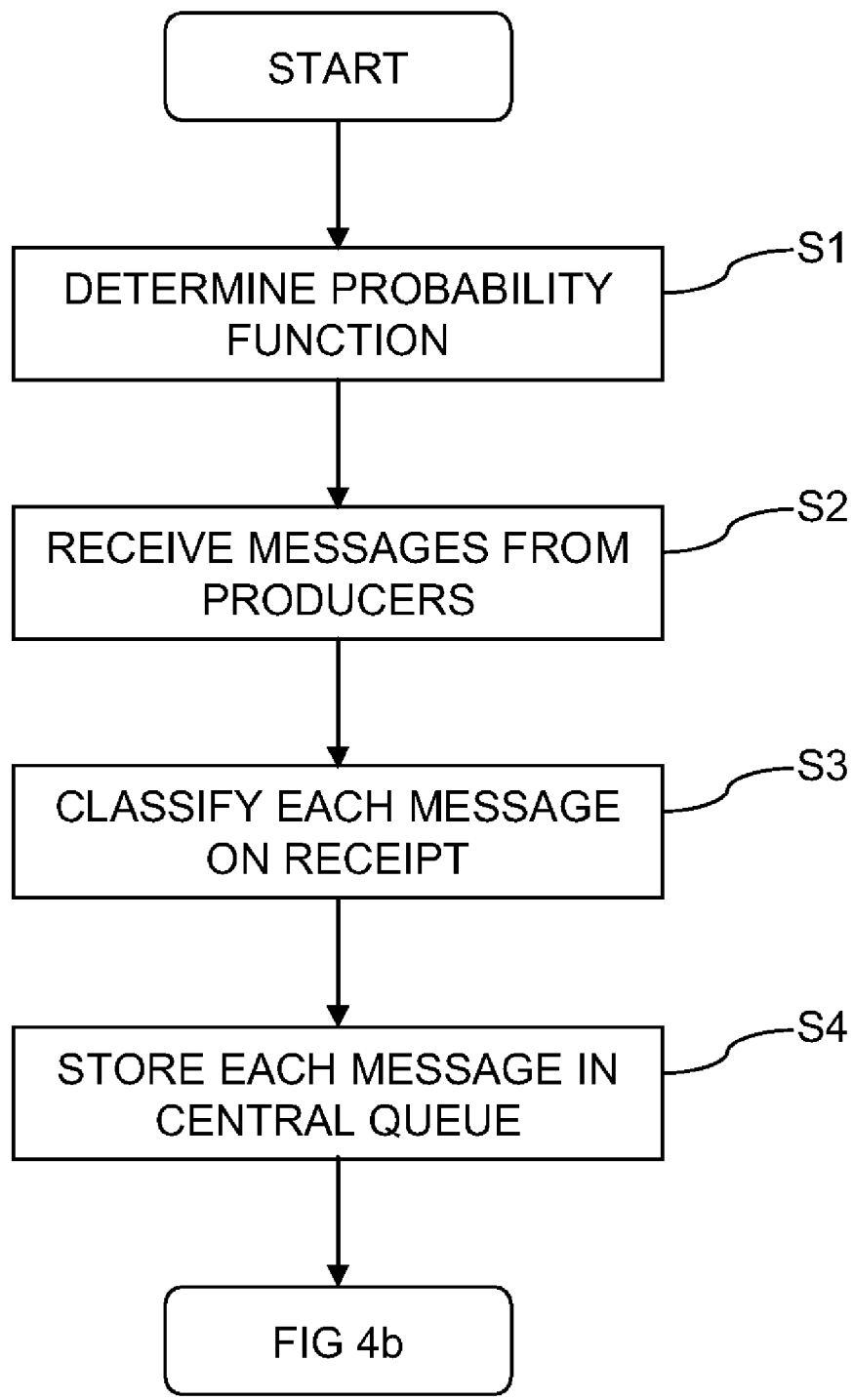
FIG. 4 is a flowchart of a method of routing the messages.
Figure 4B:
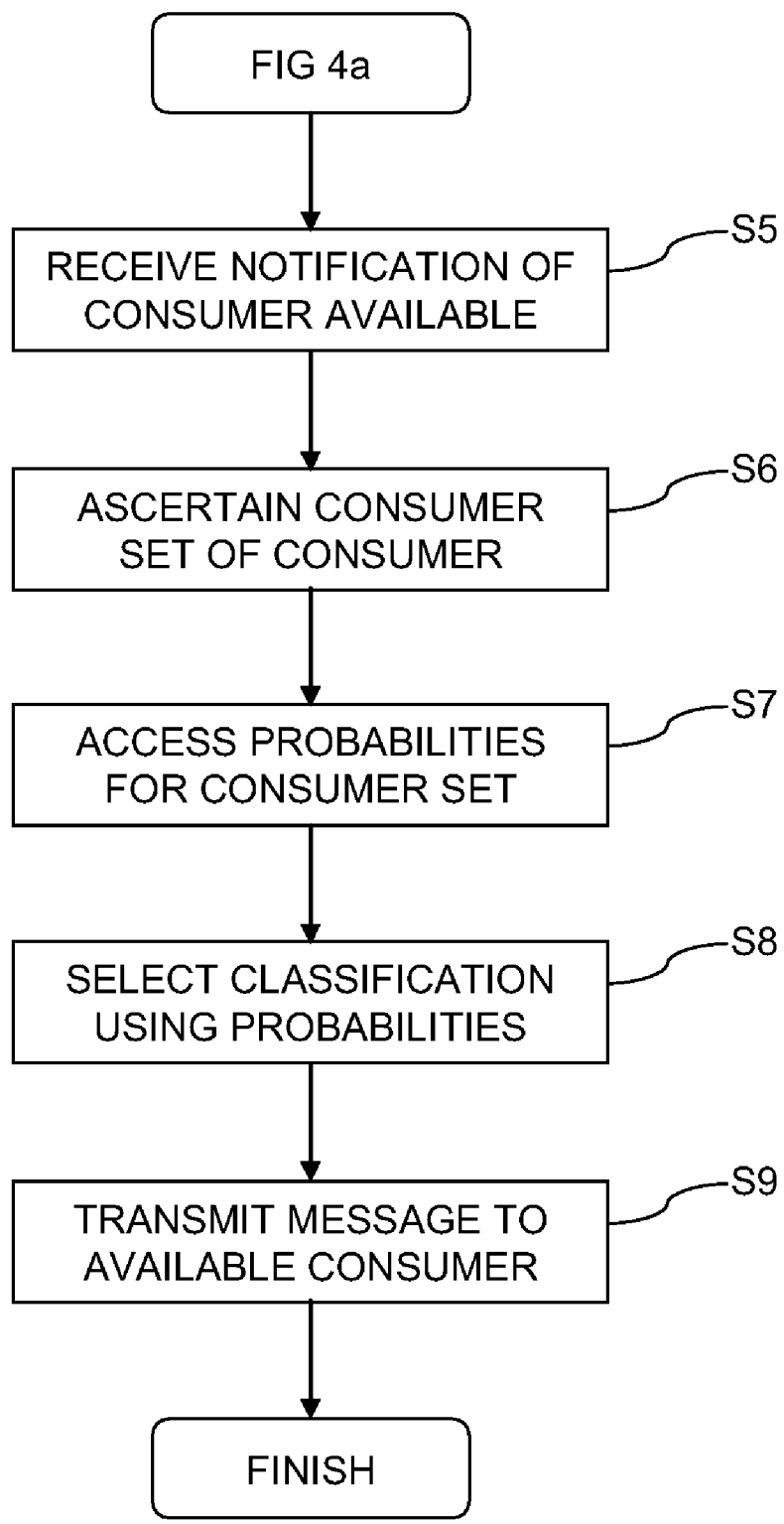

The determination of the probability function 26 is shown as a first step in the method, but it is not a pre-cursor to the receipt of messages 10 as implied by a linear flow through the process of FIG. 4a. The classification (business) rules need to be known for the messages 10 to be classified. The probability function 26 can be changed continuously and in parallel with the receipt and classification of messages 10. The probability function 26 is needed in the consume steps (which are shown in FIG. 4b).

The next step S2, is the step of receiving a plurality of messages 10, which are received at the messaging engine 20 of the workload management unit 16. These messages 10 arrive asynchronously from the producers that are connected to the unit 16. The next step is the step S3 of classifying each message, followed by the step S4 of storing each message in the queue 22. The queue 22 is a logical queue, whereby the messaging engine 20 is storing each of the received messages 10 until they can be transmitted to a consumer 12. The engine 20 communicates with the processor 18, as discussed above, in relation to the classification of the messages 10.

Once a consumer 12 becomes available to receive a piece of work embodied by a message 10, then that consumer 12 notifies the message engine 20, and at step S5, there is the step of receiving this notification at the message engine 20, of a consumer 12 being available to process a message 10. Next, there is the step S6 of ascertaining the consumer set 30 to which the available consumer 12 belongs, and this is followed by the step S7 of accessing the probabilities for the ascertained consumer set 30, as discussed in detail above with reference to FIG. 3.

Once the probabilities for the specific consumer set 30 are recalled, then there is carried out the step S8 of selecting a message classification 28 according to the accessed probabilities, and once the classification 28 has been selected, then the process is completed by the final step S9 of transmitting a message 10, of the selected classification 28, to the available consumer 12. In this way, whenever a consumer 12 indicates that they can receive a message 10 for processing, they are assigned a message 10 immediately, but the message 10 transmitted is not necessarily the oldest message 10 available (as in classic lazy assignment), but the message 10 chosen is driven by the dispatch criteria embodied in the probability function 26.

The flowchart of FIG. 4 is expressed in the above discussion as a linear process, but in fact the process is in two asynchronous parts, as shown in the two sub-processes of FIGS. 4a and 4b. Each of these parts of the process will be being repeated, with the sub-process of FIG. 4a being run through every time a message 10 is received, and the sub-process of FIG. 4b being run, whenever a consumer 12 indicates that it is available to receive a message 10. The two parts of the process could be running simultaneously, if a message 10 is received at the same time as a consumer 12 indicating that it is available for a piece of work.

As discussed above, the messages 10 are classified as they are received. Messages are classified 10 according to rules configured in the processor 18, based on service policies. The requirement is independently to classify individual messages 10. This classification can then be used to influence the order of message dispatch to any message consumers 12. The means of classifying each message is entirely at the processor's discretion. The processor 18 can execute whatever pattern matching is necessary against the message content (headers or body). The processor 18 could, for example apply an XPath filter to an XML body, or anything else that is appropriate to the format of the message 10.

Classification is performed by the processor 18 before the message 10 is en-queued to the queue 22. The classification is returned by the processor 18 so that it can be added to the message 10 as a header property, with a well-known name. When the classification has been added to the message 10, the message 10 is then en-queued on the queue 22, which may result in it being persisted. The message is then available for consumption.

Messages are stored on the queue 22 in FIFO order. The system ensures that the order of message consumption is influenced by each message's classification. However, this change in message dispatch ordering is performed at a level such that the consuming applications are unaware of it, the applications will not be written to receive messages of particular classifications.

When a consumer 12 is available for a message 10 the messaging engine 20 will choose the next message 10 based on a per-classification computed weighting across all message classifications relevant to the consumer's deployment target. This requires two messaging engine facilities, the ability to group a number of related consumers 12 together, based on their location (their deployment targets) for example, and the ability to weight the delivery of a message 10 based on the consumer set 30 and a message's classification 28. The first of these requirements has been satisfied by the ability to group consumers 12 into sets 30, as described above.

To satisfy the ability to define weightings, each consumer set 30 can have a set of flow properties to specify the weightings. This can be performed at any time, setting the flow properties on a consumer set 30 will automatically supersede any previously defined flow properties:
void setFlowProperties(Flow[ ]);
Where a Flow can be created using the following constructor:
Flow(String classification, int weighting)

The classification string should exactly match the classification identifier string returned by an analyseMessage( ). The weighting value is a non-negative value which is used to weight messages of the specified classification with respect to other message classifications listed in the weighting array (it is not necessary for all weighting values in the array to add up to 100). The set of weightings will result in assigning each message classification 28 a probability of dispatch, for the specific consumer set 30.

As far as the system is concerned, the classifications are simply discrete labels that are used to identify a service class. There is no ordering of classifications, as far as the system is concerned they are simply buckets, into which messages 10 are logically placed.

Any messages 10 that either have no classification value (for example, being en-queued before the processor 18 was registered) or have a classification value not listed in the current Flow array, will be handled as if they belong to a default classification. Such messages 10 effectively belong to a lower priority than any message 10 that has a non-default classification. This is the result of the fact that when there are any non-default messages 10 on the queue 22, the messaging engine 20 will dispatch those messages 10 according to their relative flow weightings, and when there are no further non-default messages 10 to dispatch (i.e. there are none left on the queue 22) messaging engine 20 will dispatch the remaining (default) messages in FIFO order, subject to selectors, rollbacks, etc. Any messages 10 with a service class that is explicitly given a weighting of 0 in the bandwidth proportions will be handled in the same way as default messages, i.e. they are given lower priority FIFO attention.

The weightings will be used by the messaging engine 20 to decide which message 10 should be dispatched to a consumer 12 when it becomes available for a message 10. When a consumer 12 is available for its next message 10, the messaging engine 20 will use the consumer's consumer set weightings to determine the preferred classification of message 10 from the queue 22. If a suitable message 10, with that classification 28, is available, it is dispatched to the consumer 12. If no messages 10 of that classification 28 are available another classification 28 is chosen (using the remaining message weightings).

For example, the following set of flows is registered with a consumer set 30, Gold 7, Silver 2 and Bronze 1. This will (ideally) result in Gold messages being dispatched 70% of the time, Silver, 20% and Bronze 10% of the time. When a consumer 12 is ready for its next message 10, a classification 28 is randomly chosen (using the weightings). In this example, Gold is chosen but there are no Gold messages 10 on the consumer's queue 22. Another classification is therefore chosen, this time there is a 67% chance of Silver being chosen and 33% chance of Bronze. The classification Bronze is chosen, the first available Bronze message on the queue 22 is dispatched to the consumer 12.

In a second example, again, the following set of flows is registered with a consumer set, Gold 7, Silver 2 and Bronze 1. This will (ideally) result in Gold messages being dispatched 70% of the time, Silver, 20% and Bronze 10% of the time. If a Zirconium classification message 10 is en-queued on the queue 22, in addition to messages of the above classifications 28, the Zirconium message 10 is given a flow object. The flow proportion in the flow object may be non-zero, or zero. In the former case, the message 10 will receive the appropriate share of bandwidth. In the latter case, the message 10 will be dispatched when the queue contains no Gold, Silver or Bronze messages 10 to be dispatched.

Note that the system does not interpret the throughput weightings as "shares of overall processing time", but as "message dispatch proportions", so if one message 10, or classification 28 of message 10, takes longer to process than another, it is assumed that the processor 18 will interpret the dispatch statistics and detect that the throughput proportions need to be adjusted to achieve the service goals.

If there is a shortage of consumers 12, resulting in a backlog of messages 10 on the queue 22 then the system may not be able to honour the service policies for some classifications. The processor will detect such a condition, using the service metrics (e.g. delivery times) and comparing them to the service policies. The processor 18 will then adjust the number of consuming applications or the limits or throughput shares accordingly. This feedback cycle is illustrated in FIG. 5. The processor 18 is monitoring the workload of one or more of the consumers 12, and is adjusting the probability function 26 accordingly. The feedback channel 32 provides information to the processor 18 about such things as time delays and response times, which can be used by the processor 18 to adjust the weightings defined by the probability function 26.

The invention claimed is:

1. A method of routing messages to multiple consumers, wherein said method is performed by a system comprising a processor that executes instructions of a computer program product that is stored in a non-transitory storage medium, said method comprising:
   determining, via the processor executing instructions of the computer program product that is stored in the non-transitory storage medium, a probability function defining message classification probabilities for each of a plurality of consumer sets, each consumer set representing a group of one or more consumers, wherein each of the consumers is a computing resource able to perform a message processing function, wherein each consumer is assigned to a specific one of the consumer sets, wherein a plurality of different message classifications exist for messages processed by the consumers, wherein for each consumer set and for each of the different message classifications, a probability is assigned, which represents the probability that a consumer of that consumer set will process a message of that message classification given availability of the consumer to process a message, wherein the probability function is utilized to determine what probability values are assigned to each unique combination of a consumer set and a message classification;
   receiving, via the processor executing instructions of the computer program product that is stored in the non-transitory storage medium, a plurality of messages;
   classifying, via the processor executing instructions of the computer program product that is stored in the non-transitory storage medium, each message using one of the different message classifications;
   storing, via the processor executing instructions of the computer program product that is stored in the non-transitory storage medium, each message in a queue for messages to be processed by a set of consumers, said queue holding messages of the different message classifications;
   receiving, via the processor executing instructions of the computer program product that is stored in the non-transitory storage medium, notification that one of the consumers is available to process one of the messages in the queue;
   ascertaining, via the processor executing instructions of the computer program product that is stored in the non-transitory storage medium, one of the consumer sets to which the available consumer belongs;
   generating, via the processor executing instructions of the computer program product that is stored in the non-transitory storage medium, a random number from a range that covers a summation of probabilities of the message classifications for the consumer set;
   selecting, via the processor executing instructions of the computer program product that is stored in the non-transitory storage medium, a message classification according to the probabilities assigned to the message classifications given the random number, wherein the selection ensures the different message classifications are selected in proportion of the assigned probabilities, and
   transmitting, via the processor executing instructions of the computer program product that is stored in the non-transitory storage medium, a message, of the selected classification, from the queue to the available consumer for processing by the available consumer.

2. A method according to claim 1, wherein the probability function comprises a table of percentages or ratios, with a first axis representing message classification and a second axis representing consumer set.

3. A method according to claim 2, further comprising monitoring the workload of one or more of the consumers, and adjusting the probability function accordingly.

4. A method according to claim 1 further comprising accessing one or more business rules, and adjusting the probability function accordingly.

5. A method according to claim 1, wherein the step of transmitting a message, of the selected classification, to the available consumer, comprises transmitting the oldest message, of the selected classification, to the available consumer.

6. A system for routing messages to multiple consumers comprising a work management unit comprised of a processor and messaging engine arranged to:
   determine a probability function defining message classification probabilities for each of a plurality of consumer sets, each consumer set representing a group of one or more consumers, wherein each of the consumers is a computing resource able to perform a message processing function, wherein each consumer is assigned to a specific one of the consumer sets, wherein a plurality of different message classifications exist for messages processed by the consumers, wherein for each consumer set and for each of the different message classifications, a probability is assigned, which represents the probability that a consumer of that consumer set will process a message of that message classification given availability of the consumer to process a message, wherein the probability function is utilized to determine what probability values are assigned to each unique combination of a consumer set and a message classification;

receive a plurality of messages;

classify each message using one of the different message classifications;

store each message in a queue for messages to be processed by a set of consumers, said queue holding messages of the different message classifications;

receive notification that one of the consumers is available to process one of the messages in the queue;

ascertain one of the consumer sets to which the available consumer belongs;

generate a random number from a range that covers a summation of probabilities of the message classifications for the consumer set;

select a message classification according to the probabilities assigned to the message classifications given the random number, wherein the selection ensures the different message classifications are selected in proportion of the assigned probabilities, and transmit a message, of the selected classification, from the queue to the available consumer for processing by the available consumer.

7. A system according to claim 6, wherein the probability function comprises a table of percentages or ratios, with a first axis representing message classification and a second axis representing consumer set.

8. A system according to claim 6, wherein the processor is further arranged to monitor the workload of one or more of the consumers and adjust the probability function accordingly.

9. A system according to claim 6 wherein the processor is further arranged to access one or more business rule, and adjust the probability function accordingly.

10. A system according to any one of claim 6, wherein the processor is arranged, when transmitting a message, of the selected classification, to the available consumer, to transmit the oldest message, of the selected classification, to the available consumer.

11. A computer program product on a non-transitory computer readable medium for routing messages to multiple consumers, the product comprising instructions for:

determining a probability function defining message classification probabilities for each of a plurality of consumer sets, each consumer set representing a group of one or more consumers, wherein each of the consumers is a computing resource able to perform a message processing function, wherein each consumer is assigned to a specific one of the consumer sets, wherein a plurality of different message classifications exist for messages processed by the consumers, wherein for each consumer set and for each of the different message classifications, a probability is assigned, which represents the probability that a consumer of that consumer set will process a message of that message classification given availability of the consumer to process a message, wherein the probability function is utilized to determine what probability values are assigned to each unique combination of a consumer set and a message classification;

receiving a plurality of messages;

classifying each message using one of the different message classifications;

storing each message in a queue for messages to be processed by a set of consumers, said queue holding messages of the different message classifications;

receiving notification that one of the consumers is available to process one of the messages in the queue;

ascertaining one of the consumer sets to which the available consumer belongs;

generating a random number from a range that covers a summation of probabilities of the message classifications for the consumer set;

selecting a message classification according to the probabilities assigned to the message classifications given the random number, wherein the selection ensures the different message classifications are selected in proportion of the assigned probabilities, and transmitting a message, of the selected classification, from the queue to the available consumer for processing by the available consumer.

12. A computer program product on the non-transitory computer readable medium according to claim 11, wherein the probability function comprises a table of percentages or ratios, with a first axis representing message classification and a second axis representing consumer set.

13. A computer program product on the non-transitory computer readable medium according to claim 11 further comprising instructions for monitoring the workload of one or more of the consumers, and adjusting the probability function accordingly.

14. A computer program product on the non-transitory computer readable medium according to claim 11 and further comprising instructions for accessing one or more business rules, and adjusting the probability function accordingly.

15. A computer program product on the non-transitory computer readable medium according to claim 11, wherein the instructions for transmitting a message, of the selected classification, to the available consumer, comprise instructions for transmitting the oldest message, of the selected classification, to the available consumer.

16. The method of claim 1, wherein the message classification probabilities are expressed as a percentage, wherein a sum of the probabilities assigned to message classifications of each of the consumer sets equals one hundred percent.

17. The method of claim 1, wherein each of the different consumer sets of the plurality of consumer sets has a different set of values for the message classification probabilities than the values established for other ones of the consumer sets.

18. The method of claim 1, further comprising:

establishing a plurality of different queues, one for each message classification; and responsive to classifying each message, storing the message in one of the different queues corresponding to the message classification; and responsive to selecting the message classification, selecting the message from the different queue corresponding to the message classification, where the selected message is the message that has been in that specific queue the longest.

19. The method of claim 1, wherein said method increases a degree of coupling between a classification mechanism that classifies the messages and a dispatch mechanism that transmits messages to the multiple consumers when routing said messages to the multiple consumers.

* * * * *